E. J. VRAALSTAD.
THRESHING MACHINE FRAME.
APPLICATION FILED JUNE 6, 1908.
947,137.
Patented Jan. 18, 1910.
3 SHEETS—SHEET 3.
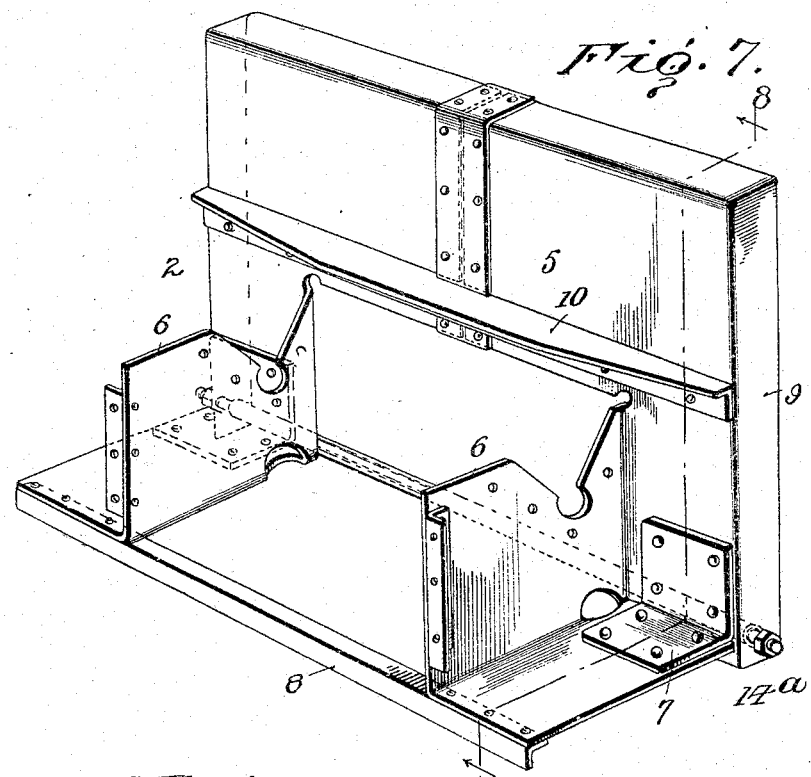
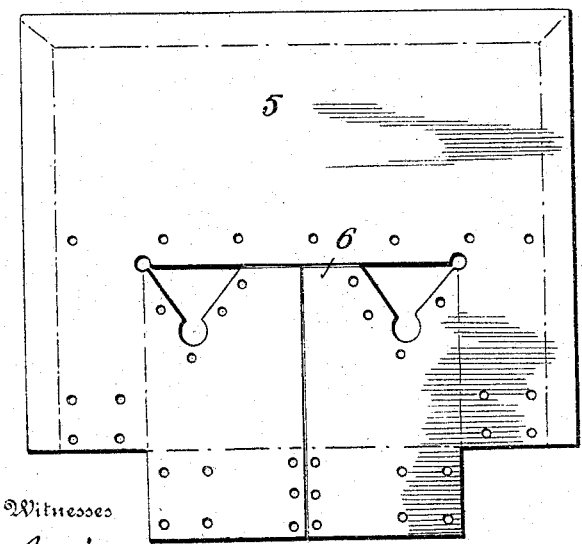
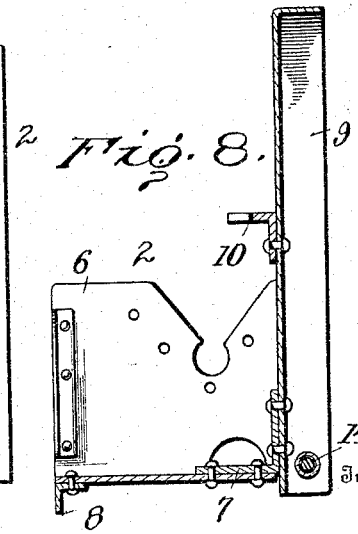
Witnesses
Inventor
E. J. Vraalstad
By
Attorney

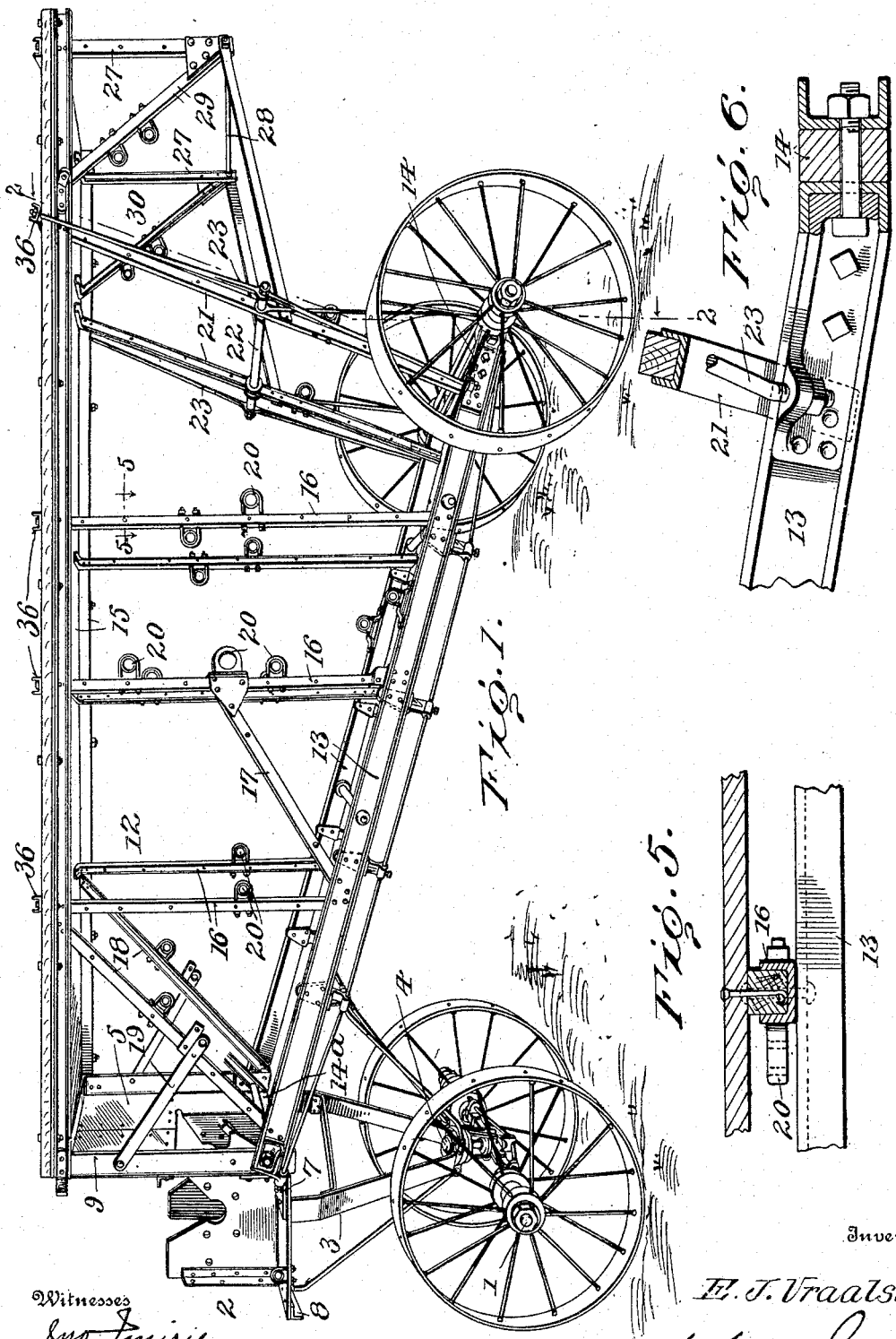

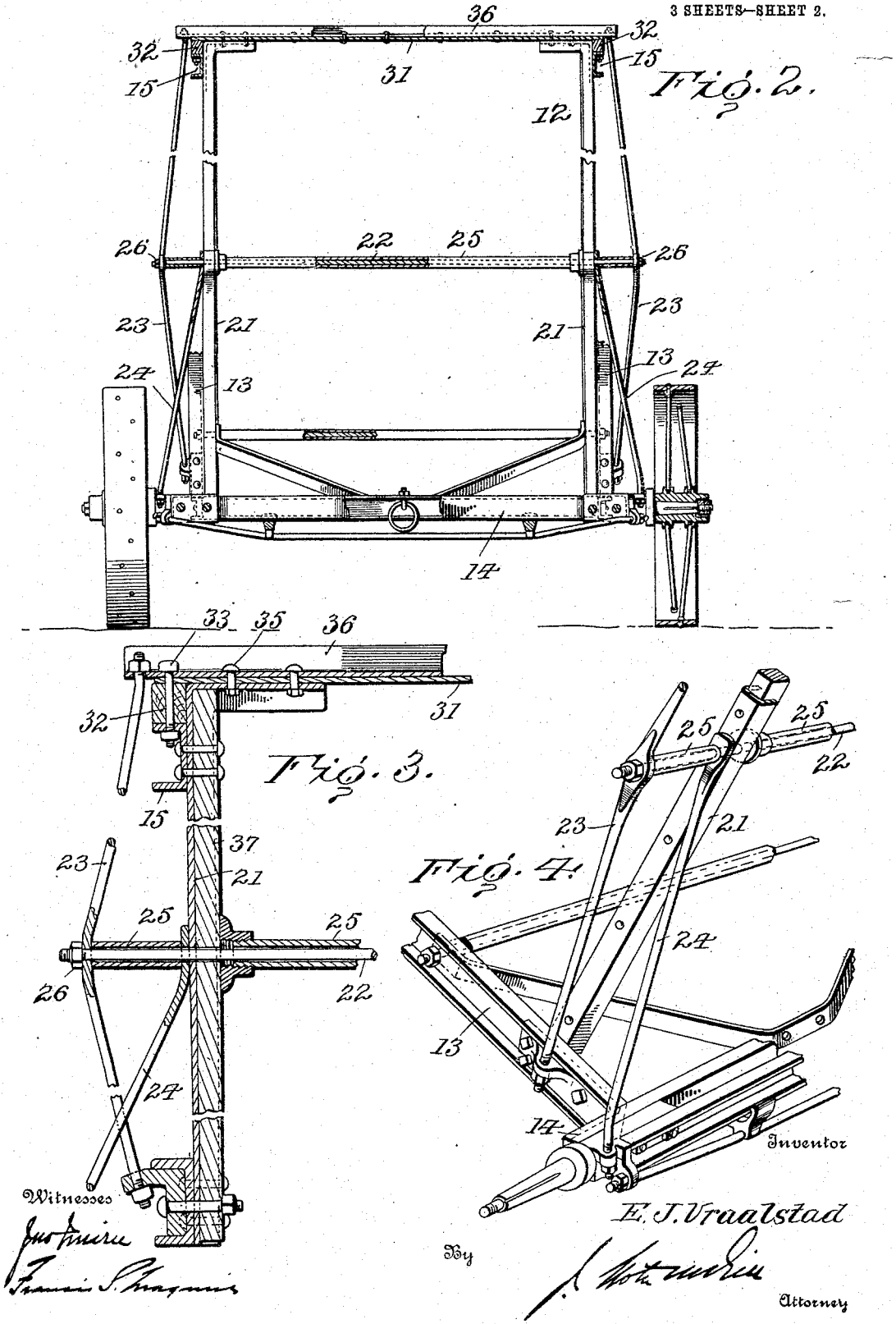

UNITED STATES PATENT OFFICE.

EDWARD J. VRAALSTAD, OF BUFFALO, NEW YORK, ASSIGNOR OF ONE-HALF TO BUFFALO PITTS COMPANY, OF BUFFALO, NEW YORK, A CORPORATION OF NEW YORK.

THRESHING-MACHINE FRAME.

947,137.            Specification of Letters Patent.      Patented Jan. 18, 1910.

Application filed June 6, 1908. Serial No. 437,130.

*To all whom it may concern:*

Be it known that I, EDWARD J. VRAALSTAD, of Buffalo, in the county of Erie and State of New York, have invented certain new and useful Improvements in Threshing-Machine Frames; and I do hereby declare the following to be a full, clear, and exact description of the invention, such as will enable others skilled in the art to which it appertains to make and use the same.

The primary object of this invention is to provide a strong and durable threshing machine frame and one capable of resisting torsional strain.

Further objects are to so construct a thresher frame of metal as to enable the housing or linings to be readily secured thereto; and also to provide a simple and rigid support for the frame and the thresher cylinder.

The invention will be hereinafter fully set forth and particularly pointed out in the claims.

In the accompanying drawings, Figure 1 is a view of the machine frame in perspective. Fig. 2 is a section on line 2—2, Fig. 1. Fig. 3 is an enlarged sectional view of a portion of the frame and truss with parts broken away. Fig. 4 is a fragmentary view in perspective of portions of the truss, rear axle, and adjacent frame members. Fig. 5 is an enlarged sectional view on line 5—5, Fig. 1. Fig. 6 is an enlarged view showing a portion of a sill, rear axle and brace rod. Fig. 7 is a view in perspective of the support for the front end of the frame and the bearings for the threshing cylinder. Fig. 8 is a section on line 8—8, Fig. 7. Fig. 9 shows the blank from which the support is made.

Referring to the drawings, 1 designates the axle of the front carrying wheels upon which is mounted a support 2, having a depending bracket 3 which, by a universal joint 4, is connected to the front axle. The support 2 is composed of an inner wall 5, preferably formed from two connected plates extending cross-wise of the vehicle, and two forwardly-projecting parallel plates 6, preferably integral with, and bent forwardly from, the plates forming wall 5. These plates 6 have their lower ends bent outwardly, and said ends at their rear edges are secured by angle plates 7 to wall 5. A brace bar 8 is secured to the undersides of the outwardly bent ends of plates 6, and the top and side edges of wall 5 are bent back to form flanges 9. If preferred wall 5 may be formed from a single plate, (see Fig. 9) the two parallel plates 6 being struck therefrom, but for convenience I make this wall from two plates, and strengthen it by a cross brace 10. The two parallel plates 6 form the bearings for the thresher cylinder, not shown.

The frame 12 to which the housing or lining of the machine is secured and by which the carriers, conveyers and other operative parts of the machine are supported, is of skeleton formation. It is composed almost entirely of channel bars. The sills or bottom bars 13 are suspended at their rear ends by the rear axle 14, while their forward ends are held to the rearwardly turned side flanges 9 of wall 5 by a tie-rod $14^a$. The top side bars 15 are shown as extending rearwardly some distance beyond the rear axle and at their forward ends are bolted to the top flanges 9. Each of these top bars is connected to the sills by corresponding, oppositely-disposed, spaced-apart uprights 16 which, like top bars 15 and sills 13 are of channel irons, but the channels of these uprights face inwardly. The oppositely-disposed central uprights 16 may be strengthened by diagonal braces 17 secured thereto and to the sills, and additional support may be secured by diagonal braces 18 connecting the top bars and sills, and these braces in turn may be strengthened by straps 19 secured to side flanges 9. The braces 18 as well as the several uprights are equipped with suitable shaft or hanger bearings 20 for the various parts of a thresher.

21 designates two corresponding rearwardly-inclined braces connecting the top side bars to the sills, the connections to the latter being just forward of the points of suspension of the sills on the rear axle. A tie-rod 22 connects the two rearwardly-inclined braces 21. In order to resist torsional strain this tie-rod at its ends is connected by diagonal brace rods 23 to the top of the frame and to the sills; and is also connected by two brace rods 24 direct to the rear axle, these latter brace rods 24 crossing the lower portions of brace rods 23. Upon rod 22 are spacing thimbles 25, and upon the ends of said rod are binding nuts 26.

In a thresher it is not possible to brace or strengthen the frame by connections between the sides thereof which will in any way interfere with the location and movements of the various parts of the machine or interfere with the passage of the material. Hence the transverse tie rod 22 is located at a point to avoid all difficulty in this respect. The several brace rods 23 and 24, coupled with the tie-rod 22, enable the frame to resist torsional strain. In other words, a truss for the deck is formed by the several brace rods and the tie rod. Ordinarily to properly truss a superstructure the lower ends of brace rods similar to the rods 23 should be carried out some distance beyond the sides of such superstructure, but since this is not feasible in a machine of this character, the same result is obtained by securing the lower ends of brace rods 23 to the base or sills and by employing the tie rod 22 as an intermediate connection or support for the extended portions of such brace rods. This tie rod being itself connected to the sill by the second set of brace rods 24, it will be seen that not only is the deck supported as against any torsional strain, but the sides of the frame itself are securely braced.

The top side bars are shown as extended rearwardly a short distance beyond the rearwardly-inclined braces 21, and as supporting at their outer ends depending bars 27 which are connected at their lower ends by a cross rod 28 and strengthened by diagonal braces 29 and 30, all of these parts, with the exception of the cross rod 28, being channel irons.

31 designates the deck extending over the frame and preferably made of sheet metal secured at its side edges to filler bars 32, preferably of wood. The deck is secured to side bars 15 by nutted bolts 33 passed through the fillers and the upper flanges of such side bars, while the upper ends of the side uprights are bent inwardly and preferably secured to the deck by bolts 35. On the top of the deck are cross-bars 36, for adding to the strength of the frame, and to one of which the brace-rods 23 are preferably secured.

Wood fillers 37 are secured in the channels of the several uprights so as to form surfaces to which the housing or lining (not shown) of the thresher may be readily secured, said fillers being held in the channels by bolts or rivets.

I have found in actual practice that by making a skeleton frame of metal, preferably composed of channel bars, I am enabled to produce a frame which is much lighter and far more durable than an all-wood frame; that by providing a practically rigid inflexible support for the thresher cylinder and the forward end of the skeleton frame, and also by connecting the sides by the deck and bracing the frame in close proximity to its suspension on the rear carrying axle, the frame will resist torsional strain. In consequence, the danger of breakage, especially in passing over rough roads, is reduced to a minimum. Furthermore, by making the frame of channel bars the necessary wood fillers, forming anchors for the housing or lining of the thresher, may be readily and easily secured in place.

I claim as my invention:—

1. In combination with front and rear carrying wheels and axles therefor, a threshing machine frame comprising a base mounted on the rear axle, a deck and side members, means for trussing said deck to said base in proximity to said rear axle, such means comprising brace rods secured to deck and carried outwardly therefrom, rigid supports mounted in the sides of the frame and extended laterally therefrom, the extended portions of the brace rods being secured to said supports, and a second set of brace rods connecting said supports to said base in proximity to said rear axle, and means pivotally connecting said front axle to the forward end of said frame.

2. In combination with front and rear carrying wheels and axles therefor, a threshing machine frame comprising a base mounted on the rear axle, a deck and side members, means for trussing said deck to said base in proximity to said rear axle, such means comprising brace rods secured to deck and carried outwardly therefrom and connected at their inwardly-drawn lower ends to the sides of said base, rigid supports mounted in the sides of the frame and extended laterally therefrom, the extended portions of the brace rods being secured to said supports, and a second set of brace rods connecting said supports to said base in proximity to said rear axle, and means pivotally connecting said front axle to the forward end of said frame.

3. In combination with front and rear carrying wheels and axles therefor, a threshing machine frame comprising a base mounted on the rear axle, a deck and side members, means for trussing said deck to said base in proximity to said rear axle, such means comprising brace rods secured to deck and carried outwardly therefrom and connected at their inwardly drawn lower ends to the sides of said base, a tie rod supported by said sides and projecting beyond the latter, the extended portions of said brace rods being secured to the projecting ends of said tie rods, and a second set of brace-rods connecting said tie rods to said base in proximity to said rear axle, and means pivotally connecting said front axle to the forward end of said frame.

In testimony whereof, I have signed this specification in the presence of two subscribing witnesses.

EDWARD J. VRAALSTAD.

Witnesses:
H. P. SEIPP,
C. M. GREINER.